US007996677B2

(12) United States Patent
Charles et al.

(10) Patent No.: US 7,996,677 B2
(45) Date of Patent: Aug. 9, 2011

(54) DIGITALLY CERTIFIED STATIONERY

(75) Inventors: Denis X. Charles, Bellevue, WA (US); Kamal Jain, Bellevue, WA (US); Kristin E. Lauter, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 1235 days.

(21) Appl. No.: 11/567,707

(22) Filed: Dec. 6, 2006

(65) Prior Publication Data

US 2008/0141330 A1 Jun. 12, 2008

(51) Int. Cl.
*H04L 9/32* (2006.01)
(52) U.S. Cl. .......................... 713/175; 713/156
(58) Field of Classification Search .................. None
See application file for complete search history.

(56) References Cited

U.S. PATENT DOCUMENTS

| | | | |
|---|---|---|---|
| 5,157,726 A | 10/1992 | Merkle et al. | |
| 5,544,255 A | 8/1996 | Smithies et al. | |
| 5,712,914 A * | 1/1998 | Aucsmith et al. | 380/30 |
| 5,765,176 A | 6/1998 | Bloomberg | |
| 5,912,974 A | 6/1999 | Holloway et al. | |
| 5,970,252 A * | 10/1999 | Buxton et al. | 717/166 |
| 6,021,202 A * | 2/2000 | Anderson et al. | 705/54 |
| 6,023,509 A | 2/2000 | Herbert et al. | |
| 6,108,788 A * | 8/2000 | Moses et al. | 713/155 |
| 6,138,106 A * | 10/2000 | Walker et al. | 705/14.1 |
| 6,671,804 B1 * | 12/2003 | Kent | 713/175 |
| 6,892,947 B1 | 5/2005 | Jam et al. | |
| 6,907,528 B1 * | 6/2005 | Bunn | 713/179 |
| 6,990,585 B2 * | 1/2006 | Maruyama et al. | 713/176 |
| 7,073,195 B2 * | 7/2006 | Brickell et al. | 726/5 |
| 7,092,953 B1 * | 8/2006 | Haynes | 705/51 |
| 7,103,572 B1 * | 9/2006 | Kawaguchi et al. | 705/40 |
| 7,117,363 B2 | 10/2006 | Lincoln et al. | |
| 7,252,222 B2 | 8/2007 | Finnerty et al. | |
| 7,328,847 B1 | 2/2008 | Shen et al. | |
| 7,340,611 B2 * | 3/2008 | Alev et al. | 713/180 |
| 7,353,397 B1 * | 4/2008 | Herbach | 713/176 |

(Continued)

FOREIGN PATENT DOCUMENTS

KR 20040064780 A 7/2004

(Continued)

OTHER PUBLICATIONS

PCT Search Report for Application No. PCT/US2008/063886, mailed Oct. 29, 2008, 11 pgs.

(Continued)

*Primary Examiner* — Peter Poltorak
(74) *Attorney, Agent, or Firm* — Lee & Hayes PLLC

(57) ABSTRACT

Systems and methods for digitally certified stationery are described. In one aspect, a stationery granting authority (SGA) receives a request from a user to generate a document. If the user is authorized for the requested document, the SGA generates a certificate with credentialing information from data in the request. The SGA generates a first digital signature from some of the credentialing information. The SGA communicates the certificate to the user for editing and distribution as the document. A recipient of the document determines whether the document is "official" by contacting a specified service to provide certain information from the document. The verification service computes a second digital signature from the provided information for comparison to the first digital signature. If there is a match, the service notifies the recipient that the document is valid/official. Otherwise, the recipient is notified that the document is not valid.

19 Claims, 3 Drawing Sheets

U.S. PATENT DOCUMENTS

| | | |
|---|---|---|
| 7,441,121 B2 * | 10/2008 | Cutter et al. ............... 713/175 |
| 7,526,642 B2 * | 4/2009 | Hurtta et al. ............... 713/155 |
| 7,581,102 B2 * | 8/2009 | Yasuda ....................... 713/175 |
| 7,581,106 B1 * | 8/2009 | Das et al. ................... 713/176 |
| 7,647,494 B2 * | 1/2010 | Wray et al. ................. 713/158 |
| 2002/0012445 A1 | 1/2002 | Perry |
| 2002/0013899 A1 * | 1/2002 | Faul ............................ 713/156 |
| 2002/0026574 A1 * | 2/2002 | Watanabe et al. ......... 713/155 |
| 2002/0101597 A1 | 8/2002 | Hoover |
| 2002/0103723 A1 * | 8/2002 | Platner et al. ............... 705/27 |
| 2002/0129257 A1 * | 9/2002 | Parmelee et al. .......... 713/180 |
| 2002/0166049 A1 * | 11/2002 | Sinn ........................... 713/175 |
| 2003/0004997 A1 * | 1/2003 | Parker et al. ............... 707/513 |
| 2003/0012374 A1 | 1/2003 | Wu et al. |
| 2003/0018585 A1 * | 1/2003 | Butler et al. ................ 705/53 |
| 2003/0078880 A1 * | 4/2003 | Alley et al. ................. 705/38 |
| 2003/0204812 A1 | 10/2003 | Hayashi |
| 2004/0073446 A1 * | 4/2004 | Snow ............................ 705/1 |
| 2005/0019937 A1 * | 1/2005 | Shiue et al. ................. 436/86 |
| 2005/0038756 A1 | 2/2005 | Nagel |
| 2006/0072781 A1 | 4/2006 | Harrington |
| 2006/0085634 A1 * | 4/2006 | Jain et al. ................... 713/156 |
| 2006/0085646 A1 * | 4/2006 | Cutter et al. ............... 713/175 |
| 2006/0161781 A1 * | 7/2006 | Rice et al. .................. 713/176 |
| 2006/0265590 A1 * | 11/2006 | DeYoung et al. .......... 713/176 |
| 2006/0271787 A1 | 11/2006 | DeYoung et al. |
| 2007/0073626 A1 * | 3/2007 | Reeder et al. ................ 705/59 |
| 2007/0074029 A1 | 3/2007 | Yamamoto |
| 2007/0165261 A1 | 7/2007 | Someya |
| 2008/0046984 A1 | 2/2008 | Bohmer et al. |

FOREIGN PATENT DOCUMENTS

WO      WO0237309 A1      5/2002

OTHER PUBLICATIONS

Bender et al., "Techniques for data hiding", IBM Systems Journal, vol. 35, Nos. 3&4, 1996, pp. 313-pp. 336.

Brassil et al., "Electonic Marking and Identification Techniques to Discourage Document Copying", IEEE Journal on Selected Areas in Communication, vol. 13, No. 8, Oct. 1995, pp. 1495-pp. 1504.

* cited by examiner

DIGITALLY CERTIFIED STATIONERY

BACKGROUND

Many companies use official stationery. Official stationery typically includes a printed letterhead of the company on good quality paper. Official stationery may also include an embedded watermark to establish origination. Official stationery is typically designated and used for "official communications" (e.g., memos, faxes, press releases, etc.), to present corporate "authority" in some manner. In some scenarios, however, official company stationery may be used for communications other than communications that the company would designate as "official". For example, official company stationery is typically easily reproducible. As a result, a corporation may lose control of the number of pieces of official company stationery available to authorized and unauthorized users for use and distribution to others. Related to the simplicity of reproducing official corporate stationery, but also independent of this attribute, it may be possible for an individual to remove official company stationery from corporate control (e.g., take a stationery home, etc.), whereupon unauthentic, but "official-looking" documents might be produced, possibly even after the individual's termination of employment with the company.

SUMMARY

Systems and methods for digitally certified stationery are described. In one aspect, a stationery granting authority (SGA) receives a request from a user to generate a document. If the user is authorized for the requested document, the SGA generates a certificate with credentialing information from data in the request. The SGA generates a first digital signature from some of the credentialing information. The SGA communicates the certificate to the user for editing and distribution as the document. A recipient of the document determines whether the document is "official" by contacting a specified service to provide certain information from the document. The verification service computes a second digital signature from the provided information for comparison to the first digital signature. If there is a match, the service notifies the recipient that the document is valid/official. Otherwise, the recipient is notified that the document is not valid.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

DETAILED DESCRIPTION

An Exemplary System

Although not required, systems and methods for digitally certified stationery are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
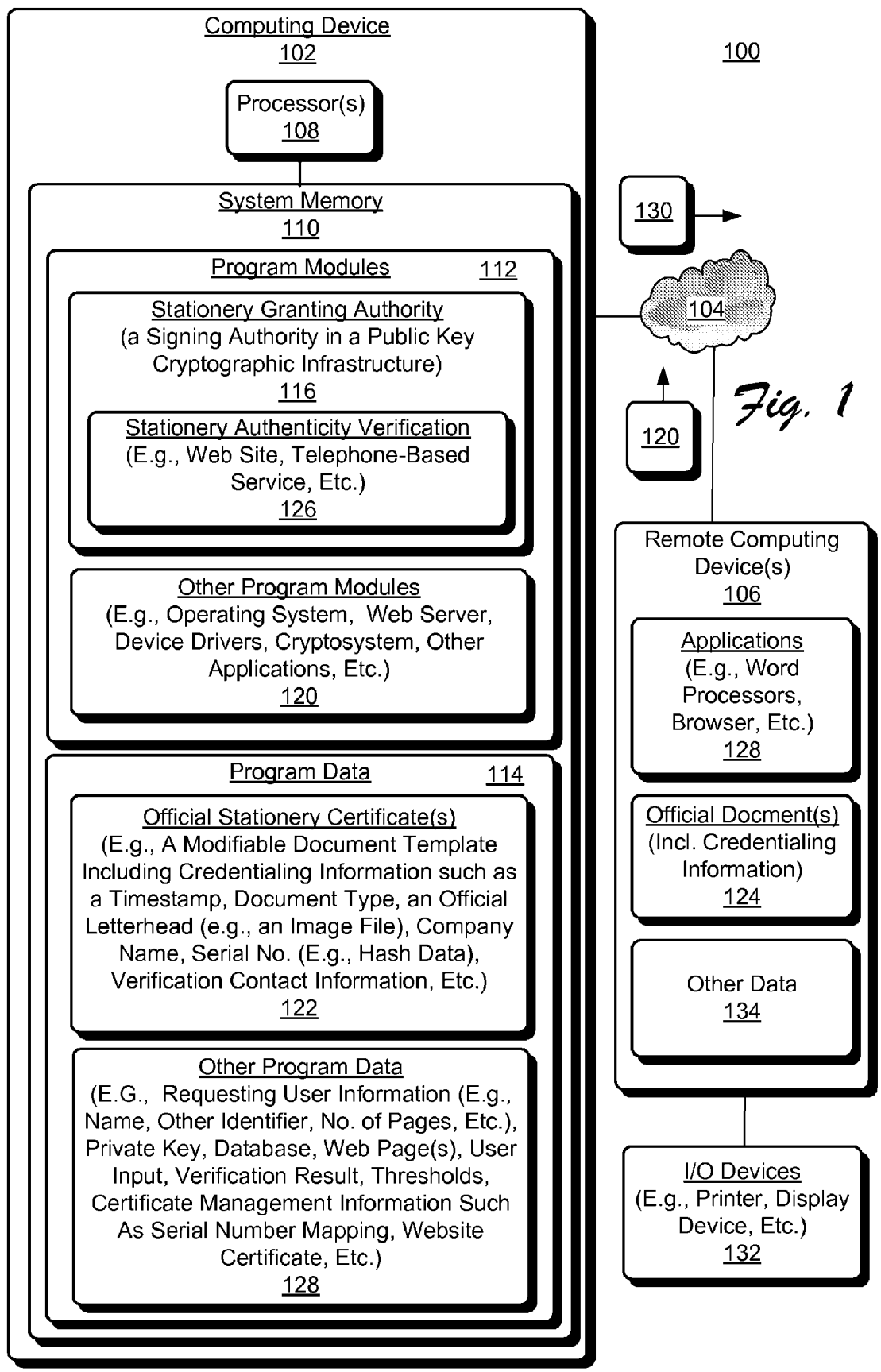
FIG. 1 shows an exemplary system for digitally certified stationery, according to one embodiment.

FIG. 1 shows an exemplary system 100 for digitally certified stationery, according to one embodiment. In this implementation, system 100 includes a computing device 102 coupled across a network 104 to one or more remote computing devices 106. Each computing device 102 and remote computing device 106 represents, for example a general purpose computing device, a server, a laptop, a mobile computing device, and/or so on, that accepts information in digital or similar form and manipulates it for a specific result based upon a sequence of instructions. To this end, each computing device 102 and 106 includes one or more processors coupled to a respective tangible computer-readable storage medium such as a system memory. System memory includes, for example, volatile random access memory (e.g., RAM) and non-volatile read-only memory (e.g., ROM, flash memory, etc.). Such a processor may be a microprocessor, microcomputer, microcontroller, digital signal processor, etc. The system memory includes computer-program modules comprising computer-program instructions executable by the one or more processors and program data that is generated and/or used by respective ones of the program modules. For example, computing device 102 includes one or more processors 108 coupled to system memory 110. System memory 110 comprises program modules 112 and program data 114.

In this implementation, program modules 112 include, for example, stationery-granting authority 116 and "other program modules" 124 such as an Operating System (OS) to provide a runtime environment, a Web server to serve web pages to a requesting remote computing device 106, device drivers, cryptographic applications, and/or other applications. Stationery-granting authority 116 responds to request (s) from an authorized user to obtain an official stationery certificate(s) (template(s)) from which the user creates and distributes official stationery/documents to end-users/readers to communicate official information (e.g., text, images, etc.). As described below, recipients of such official documents contact the stationery granting authority to verify authenticity of the received documents.

For example, a user of remote device 106 sends a request 120 to stationery-granting authority 116 ("SGA 116") to obtain an official stationery certificate 122 (template) from which the user can generate an official document 124 for distribution to recipient(s). Each request 120 includes, for example, one or more of a name or other identifier of the entity submitting the request (e.g., an employee number or other indicia mapped to the user), an indication of a particular number of pages of official stationery desired, an indication of the desired document type (e.g., a memo, a press release, company confidential communications, etc.), a suggested timeframe for which document(s) 124 generated from a template 122 will be used/distributed, etc. In one implementation, a user of remote computing device 106 interacts with a browser application to access a webpage served by SGA 116 (or a different application 120) to request an official template 122 from which the user can generate official document 124. For purposes of exemplary illustration, such a browser application is shown as a respective portion of applications 128 on remote computing device 106. In one implementation, for example, the webpage is served over an intranet (e.g., behind the company firewall or via a virtual private network connection into the intranet), over the Internet, etc. For purposes of exemplary illustration, an intranet and the Internet are collectively represented as respective portions of network 104.

Responsive to receiving a request 120, stationery-granting authority 116 accesses a database to establish identity and authority of the requesting user to use/distribute the requested stationery. Such a database is shown as a respective portion of "other program data" 130. Such identity establishment can be done in multiple different ways, for example, by verifying user login information and/or other auxiliary employee data such as the employee number (or other identifying indicia) in view of information in the database. Responsive to verifying the requesting user's identity authority to generate an official document, SGA 116 generates a certificate 122. In this implementation, a certificate 122 is a modifiable electronic document template (e.g., editable using a word processor) with a company letterhead.

Additionally, each certificate 122 is formatted with a set of credentialing information to define context(s) within which the certificate 122 can be used to generate an authentic official document 124. Such contexts include, for example, an author name, company name, a valid timeframe within which documents based on the certificate 122 can be considered valid, etc. The certificate is formatted such that a recipient of any document 124 generated from the certificate is presented with at least a subset of credentialing information to verify authenticity/validity of a document 124 generated from the certificate 122 (i.e., permission/authority of the author of the document to generate and/or distribute the document). In this implementation, credentialing information includes, for example one or more of:

- the name of the person to whom SGA 116 issued the corresponding certificate(s) 122;
- an indication of a date/time stamp of validity for any official document(s) 124 generated from the certificate 122;
- name of the entity that issued the certificate 122 (e.g., a company name);
- a unique serial number (e.g., a decimal or hexadecimal number) for the certificate 122 to distinguish the certificate 122 from any other certificate 122 issued by stationery-granting authority 116; and
- contact information indicating where/how (e.g., via an authenticated website URL, a telephone number, etc.) a recipient of an official document 124 (generated from the certificate 122) can provide certain information presented by the document 124 to verify if the received document 124 is truly "official."

In one implementation, the unique serial number portion of the credentialing information is a digital signature computed by SGA 116 from at least a subset of the credentialing information associated with the certificate 122. For example, the serial number is computed as a cryptographic hash of information (e.g., from one or more of a company name, date/timestamp information, name of requesting entity (e.g., a person, etc.), number of certificates 122 of the particular type issued to date, etc.) associated with the certificate 122. Techniques/schemes for computing cryptographic hashes of information are known. For example, in one implementation, signature-granting authority 116 generates the digital signature using known public key cryptographic techniques, wherein at least a subset of the credentialing information (metadata) is signed using a private key of the entity/company for which SGA 116 provides certificates 122 to generate official documents. In one implementation, SGA 116 generates the digital signature using known elliptic curve discrete log-based signature generating techniques, Boneh-Lynn-Shacham signature generating techniques, and/or so on.

Another possible implementation of signatures could be established using a database. The SGA 116 generates the signature by applying a keyed cryptographic hash function to the credentialing information. The keyed cryptographic hash cannot be computed by any other entity other than the SGA 116. Next, the SGA stores the issued signature in a database together with the credentialing information. At the minimum, the pair <Serial No, Keyed Hash> is stored by the SGA. At the time of authentication, the SGA verifies if the credentialing information sent by the verification requesting entity matches with the data stored in the database. If there is a match then the document is declared as a valid/official document.

After generating a particular certificate 122 from request 120, SGA 116 communicates the certificate 122 to the requesting user. (For purposes of exemplary illustration, such a communication is shown as response 130). Responsive to receiving a requested certificate 122 the requesting user opens the certificate using a word processor to view text, formatting, images, etc., and modifies (e.g., edit/insert/attach arbitrary data) the mutable portions of the document template issued by SGA 116. In one implementation, one or more portions of the template 122 are not editable. For example, in this implementation, credentialing information viewable to a recipient of certificate 122 or any official document 124 generated from certificate 122 is not editable. This is in contrast, for example, to different portion(s) of certificate 122 which are responsive to user data (e.g., text, image, etc.) input. An edited certificate 122 is shown as an official document 124 for electronic or paper distribution to recipient(s)/end user(s). (The user's document 124 is invalid if he/she modified the credentialing information portion of the document template (certificate 122)). If no changes were made to the certificate portion, then the document can be claimed as authentic and this claim can be verified by any recipient.) In one implementation, an official document 124 is distributed in a read-only format (e.g., a portable document format, a read-only word processing format, etc.).

Exemplary Stationery/Document Authenticity Verification Operations

Responsive to receiving an official document 124, a recipient prints or otherwise displays the document 124 (e.g., via a display device 132). As described above, SGA 116 formatted the certificate 122 used by an author (user) to generate document 124 so that at least a portion of the credential information associated with the certificate can be viewed by the recipient when displaying the document 124. In one implementation, the credentialing information presented to the user via document 124 includes at least: (a) that particular credentialing information used by SGA 116 to generate the serial number (i.e., the digital signature); and, (b) the contact information (e.g., a URL of a website, telephone number of a service, etc.) that the recipient can contact to determine whether the document is authentically "official".

To verify whether an author had appropriate authority to present an official document 124, a recipient contacts the particular official document verification facilities identified in the "contact information" (e.g., a URL, telephone number, etc.) presented via the credential information specified by SGA 116. Please recall that the credential information was specified by SGA 116 during creation of a certificate 122 used as a template for the official document 124. In a scenario where the contact information identifies a URL to a website hosted by stationery authenticity verification logic 126 ("SAV 126"). A recipient of a document 124 interacts with a browser application to visit the website to download, present, and input certain information into one or more official stationery authentication verification webpages. (A browser is shown as a respective portion of applications 128. Such webpage(s) are shown as respective portions of "other data" 134.)

Independent of whether the contact information identifies a website, telephone number, etc., SAV 126 and/or a document 124 directs (e.g., via presented text, images, audio, etc.) the user to input at least a subset of the credential information presented to the recipient via document 124 to SAV 126. (How such information is requested by SAV 126 and subsequently entered by the user is arbitrary, being a function of the particular technique used to obtain the information from the user (e.g., via web page user interface controls, a touch tone telephone pad, etc.)). In one implementation, the document recipient is directed to provide/enter that particular information used by SGA 116 to generate the unique serial number (e.g., author name/identifier, date and timestamp information, and/or so on) for the corresponding certificate 122. Responsive to receiving the entered/provided information, SAV 126 generates a digital signature using the same technique (e.g., elliptic curve discrete log-based signature generating techniques, etc.) that SGA 116 used to generate the serial number of the corresponding certificate 122. SAV 126 then compares the computer digital signature to the serial number mapped to the certificate 122. If the newly computed digital signature matches the serial number, SAV 126 presents an indication (e.g., a pop-up message, an e-mail, and audible indication over the telephone, etc.) to the user indicating that the official document 124 is valid. Otherwise, SAV 126 indicates to the user that the official document 124 is not valid.

In one implementation, when the contact information is a URL identifying a website to verify authenticity of an official document 124, the user verifies credentials of the website represented via the webpage(s) prior to entering any information associated with the official document 124. Only when the website is verified as authentic does the user input any information associated with the official document 124. Techniques for verifying website credentials are known. For example, in one implementation, the user compares a website certificate to the name of the company indicated as issuing the official document 124 (such as indication is provided via document 124 displayed credential information.

Exemplary Procedures

Figure 2:
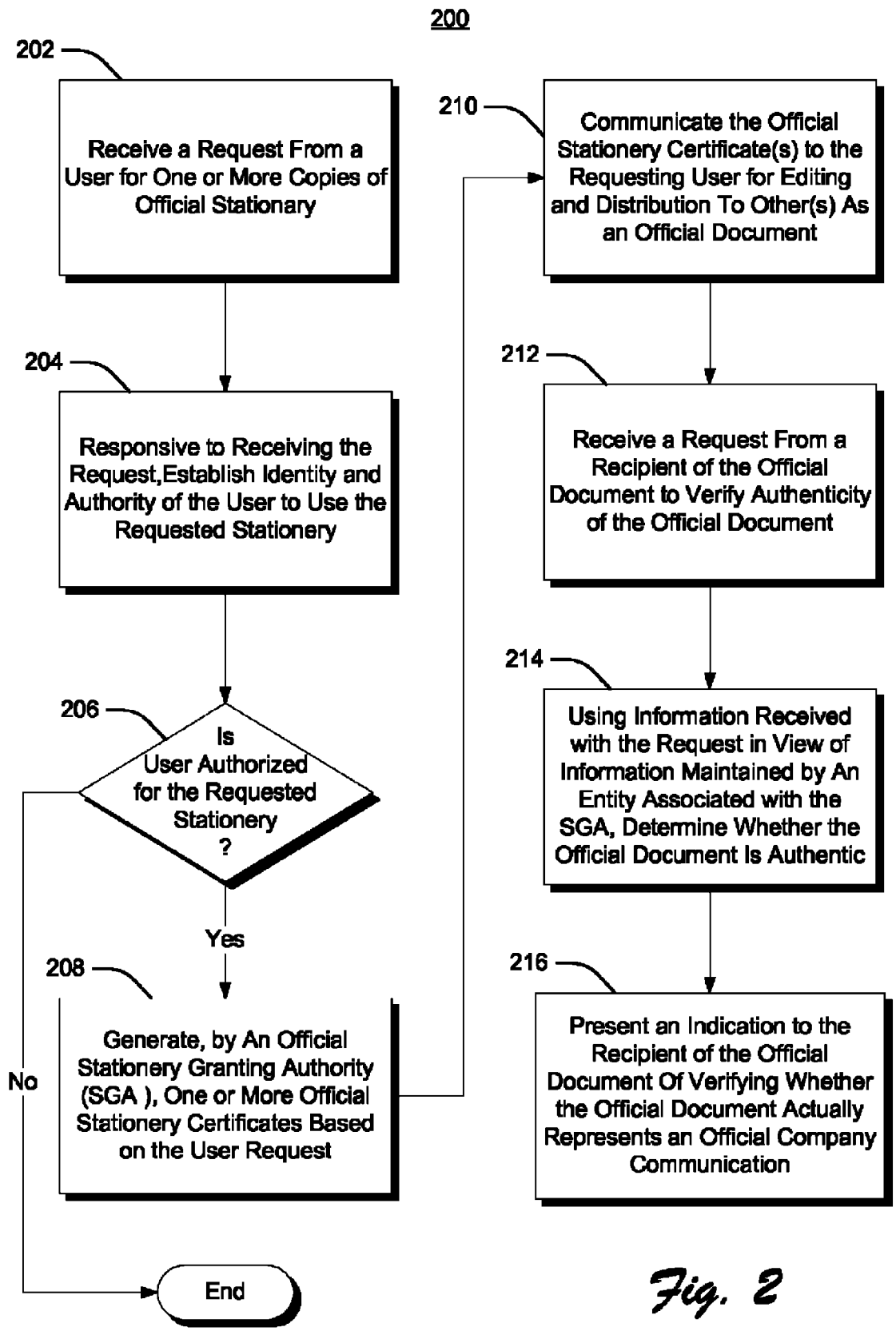
FIG. 2 shows an exemplary procedure for digitally certified stationery, according to one embodiment.

FIG. 2 shows an exemplary procedure 200 for digitally certified stationery, according to one embodiment. For purposes of exemplary illustration, the operations of procedure 200 are described with respect to the above described aspects of FIG. 1. The leftmost numeral of a reference number indicates the figure in which the component or operation was/is first introduced. In one implementation, the operations of procedure 200 are implemented by respective ones of program modules 112 FIG. 1.

Operations of block 202 receive a request 120 (FIG. 1) from a user for one or more certificates 122 (templates) to generate official document(s) 124 of a particular type. Operations of block 204, responsive to receiving the request, establish the identity and authority of the requesting user to generate and distribute the requested official document(s) 124. At block 206, if the user is not authorized for the requested document(s) 124, the operations of procedure 200 terminate. Otherwise, operations continue at block 208. Operations of block 208 generate (e.g., by an official stationery-granting authority 116) one or more official stationery certificates 122 and document credentialing information from the request 120. At least a subset of this credentialing information (name of the entity requesting the official document 124, a timestamp, company name, contact information to validate the authenticity of a document 124 generated from the certificate, etc.) is embedded in certificate 122 for subsequent presentation to end-user(s). In one implementation, one or more portions of the credentialing information (e.g., a digital signature/serial number of the certificate 122, etc.) is mapped (e.g., in a table) and maintained by the stationery-granting authority 116 for subsequent verification of any documents 124 generated from the certificate.

Operations of block 210 communicate the official stationery certificate(s) 122 to the requesting user for editing and distribution to other entities (i.e., recipients) as one or more official documents 124. Operations of block 212, receive a request 120 (e.g., from a recipient of an official document 124, or other entity) to verify authenticity of the official document 124. Responsive to receiving the request, operations of block 214 determine whether the official document 124 actually represents an official company communication. This is accomplished by using information provided by the request 120 to generate a digital signature/serial number for comparison to an archived digital signature/serial number of a certificate-122 used to generate the document 124. Operations of block 216 present an indication to the requesting user verifying whether the official document 124 represents an official company communication.

Figure 3:
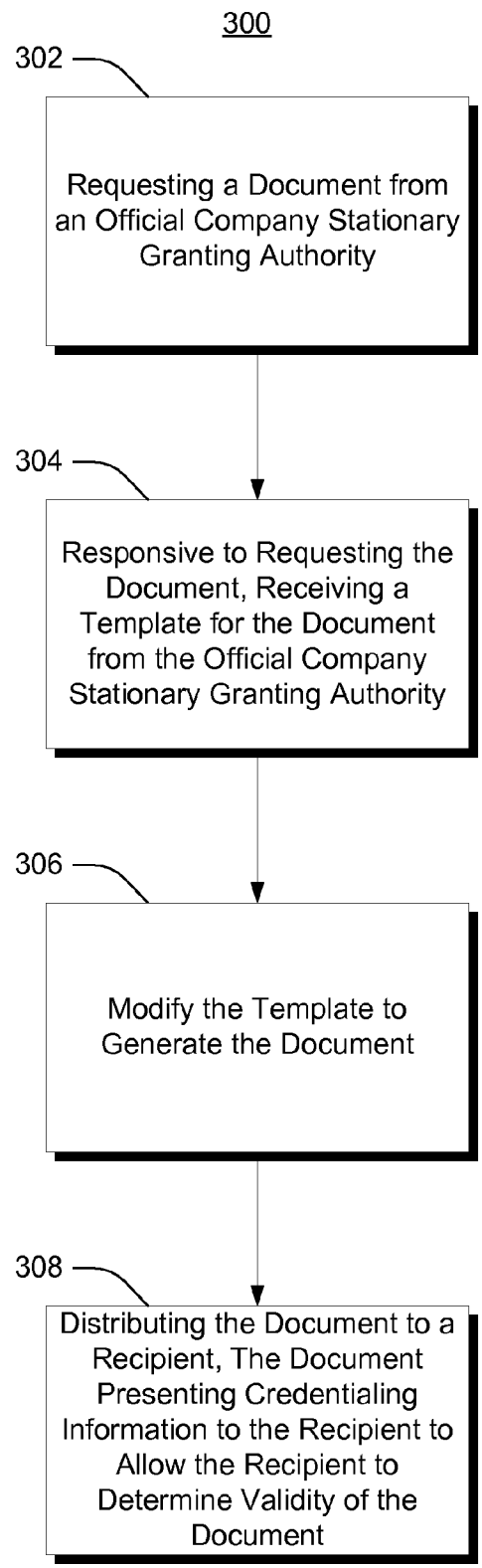
FIG. 3 shows another exemplary procedure for digitally certified stationery, according to one embodiment.

FIG.3 shows an exemplary procedure 300 for digitally certified stationery, according to one embodiment. For purposes of exemplary illustration, the operations of procedure 300 are described with respect to the above-described aspects of FIG. 1. The leftmost numeral of a reference number indicates the figure in which the component or operation was/is first introduced. In one implementation, the operations of procedure 300 are implemented by respective ones of program modules 120 and/or applications 128 of FIG. 1.

Operations of block 302 request a document (i.e., an official document 124) from an official company stationery granting authority 116. Operations at block 304, responsive to requesting the document, receive a template (an official stationery certificate 122) for the document from the official company stationery granting authority. Operations at block 306 modify the template to generate the document. Operations at block 308 distribute the document to a recipient. The document is formatted such that when the recipient views the document, credentialing information is presented to the recipient that allows the recipient to determine validity of the document. Such a validity determination is made by the recipient contacting a verification service (e.g., the official stationery granting authority or a different entity identified via the credentialing information). Once such a contact has been made, the recipient provides the verification service with at least a subset of the credentialing information presented to the recipient via the document. Responsive to receiving this information, the verification service performs a number of operations such as comparing multiple digital signatures to determine whether the document is valid (i.e., official).

CONCLUSION

Although digitally certified stationery has been described in language specific to structural features and/or methodological operations or actions, it is understood that the implementations presented in the appended claims are not necessarily limited to the specific features or actions described above. For example, although operations associated with stationery-granting authority 116 are shown as being implemented on a computing device 102 independent of a remote computing device 106 for a user to request an official stationery certificate 122, each of these and associated operations could be implemented on a single computing device 102 independent of the remote computing device 106. Additionally, although operations associated with stationery-granting authority 116 have been described as being implemented on a same computing device 102 as operations for stationery authenticity verification 126, these respective operations can be implemented in a distributed computing environment on different respective computing devices. Accordingly, the specific features and operations discussed above are disclosed as exemplary forms of implementing the following claimed subject matter.

The invention claimed is:

1. A system at least partially implemented by one or more computing devices, each of the one or more computing devices comprising:
   a processor;
   a memory coupled to the processor, the memory comprising computer-program instructions executable by the processor for performing respective ones of operations comprising:
      receiving a request from a user to generate a certificate template from which to create an official document, the request including a document type indication for the certificate template being requested;
      determining whether the user is authorized for the certificate template of the requested document; and
      in response to determining that the user is authorized for the requested document:
      generating the certificate template and credentialing information from information provided in the request including the document type indication, at least a portion of the credentialing information being a part of the certificate template for presentation as part of the official document to an end user to verify authenticity of the official document, wherein generating comprises calculating a digital signature based on at least the portion of the credentialing information;
      storing the digital signature for subsequent validity verification of the official document to a recipient; and
      communicating the certificate template to the user, wherein the certificate template is for modification by the user to create the official document, the official document being for distribution and presentation to one or more end-users.

2. The system of claim 1, wherein the credentialing information comprises an identification of the user, a name of the issuing entity, and a unique serial number.

3. The system of claim 1, wherein the credentialing information comprises an identification of the user being a name, a number, or other indicia mapped to the user.

4. The system of claim 1, wherein the credentialing information further comprises a letterhead.

5. The system of claim 1, wherein the computer-program instructions for generating the certificate template further comprise instructions for:
   calculating a digital signature based on at least a subset of the credentialing information; and
   mapping the digital signature to the official document.

6. The system of claim 1, wherein the computer-program instructions further comprise instructions for:
   receiving a request from an end-user of the official document, the request to verify authenticity that the official document represents an official communication of a granting authority, the request comprising information;
   verifying, using the information, whether the official document is being used as directed by the granting authority; and
   communicating, based on the verifying, an indication to the end user whether the official document represents an official communication of the granting authority.

7. The system of claim 6, wherein the request is received according to contact information presented to an end-user in the official document, the contact information being a respective portion of the credentialing information.

8. The system of claim 7, wherein the contact information specifies a
   URL of a website.

9. The system of claim 7, wherein the contact information specifies a telephone number of a service.

10. A system at least partially implemented by one or more computing devices, each of the one or more computing devices comprising:
    a processor;
    a memory coupled to the processor, the memory comprising computer-program instructions executable by the processor for performing respective ones of operations comprising:
       receiving a request from a user to generate an official document;
       generating a certificate template and a set of credentialing information from information provided in the request, at least a portion of the credentialing information being embedded into the certificate template for presentation to an end user to verify authenticity of the official document;
       communicating the certificate template to the user, wherein the certificate template is for modification by the user to generate the official document, the official document for distribution and presentation to one or more end-users;
       receiving a request from an end-user of the official document, the request to verify authenticity that the official document represents an official communication of a granting authority, the request comprising information;
       verifying, using the information, whether the official document is being used as directed by the granting authority;
       communicating, based on the verifying, an indication to the end user whether the official document represents an official communication of the granting authority;
       calculating, using a cryptographic scheme, a digital signature from the information;
       comparing the digital signature to a serial number maintained by the granting authority; and
       wherein the official document represents an official communication only if the digital signature matches the serial number.

11. A computer-readable memory comprising computer-program instructions executable by a processor, the computer-program instructions when executed by the processor for performing operations comprising:
    receiving a request from a user to create an official document, the request including a document type indication;
    verifying that the user is authorized for the official document; and
    responsive to determining that the user is authorized for the official document, a granting authority:
    generating a certificate template including credentialing information from information provided in the request, the credentialing information including the document type indication, at least a portion of the credentialing information being part of the certificate template for presentation to a recipient to verify authenticity of the official document, the generating comprising:
  (a) calculating a digital signature based on at least a subset of the credentialing information; and
  (b) storing the digital signature for subsequent validity verification of the official document to the recipient; and communicating the certificate to the user for modification by the user to create the official document.

12. The computer-readable memory of claim 11, wherein the credentialing information further includes a letterhead.

13. The computer-readable memory of claim 11, wherein the computer-program instructions further comprise instructions for:
  receiving a request from the recipient, the request comprising information;
  verifying, using the information, whether the official document is valid in view of a context that the certificate template for the document was created, the context being provided by the credentialing information; and
  communicating, based on the verifying, an indication to the recipient whether the official document represents an official communication of the granting authority.

14. The computer-readable memory of claim 13, wherein the computer-program instructions further comprise instructions for:
  calculating a digital signature based at least in part on the credentialing information;
  comparing the digital signature to a serial number maintained by the granting authority; and
  wherein the official document represents an official communication only if the digital signature matches the serial number.

15. The computer-readable memory of claim 11, wherein the document type is one selected from a group consisting of a memo, a press release, and a company confidential communication.

16. A method comprising:
  receiving, by one or more computing systems configured to digitally certify stationery, a request from a user of the one or more computing systems for an official stationery including an indication of a particular number of pages of official stationery desired;
  determining, by the one or more computing systems, whether the user is authorized for an official document;
  responsive to determining that the user is authorized for the official document:
  generating, by the one or more computing systems, a certificate template and credentialing information from information provided in the request, at least a portion of the credentialing information being embedded into the certificate template for presentation as a part of the official document to a recipient to verify authenticity of the document prepared with the official stationery, the generating comprising:
    calculating a digital signature based on at least a subset of the credentialing information; and
    storing the digital signature for subsequent validity verification of the document to the recipient;
  communicating, by the one or more computing systems, the certificate template to the user for modification by the user to generate the official document by modifying the template.

17. The method of claim 16, wherein the credentialing information comprises one or more of an identification of the user, a name of the issuing entity, a unique serial number, a document type indication, a timeframe within which the official stationery is valid, and a letterhead.

18. The method of claim 16 further comprising:
  receiving, by the one or more computing systems, a request from the recipient, the request comprising information;
  verifying, by the one or more computing systems, using the information, whether the official stationery is valid in view of a context that the certificate template for the document was created, the context being provided by the credentialing information; and
  communicating, by the one or more computing systems, based on the verifying, an indication to the recipient whether the official stationery represents an official communication of a granting authority.

19. The method of claim 18, further comprising comparing the digital signature to a serial number maintained by the computing systems configured to digitally certify stationery, wherein the official stationary is valid when the digital signature matches the serial number.

* * * * *